(No Model.) 7 Sheets—Sheet 1.
E. G. SHORTT.
AIR BRAKE VALVE MECHANISM.
No. 538,543. Patented Apr. 30, 1895.
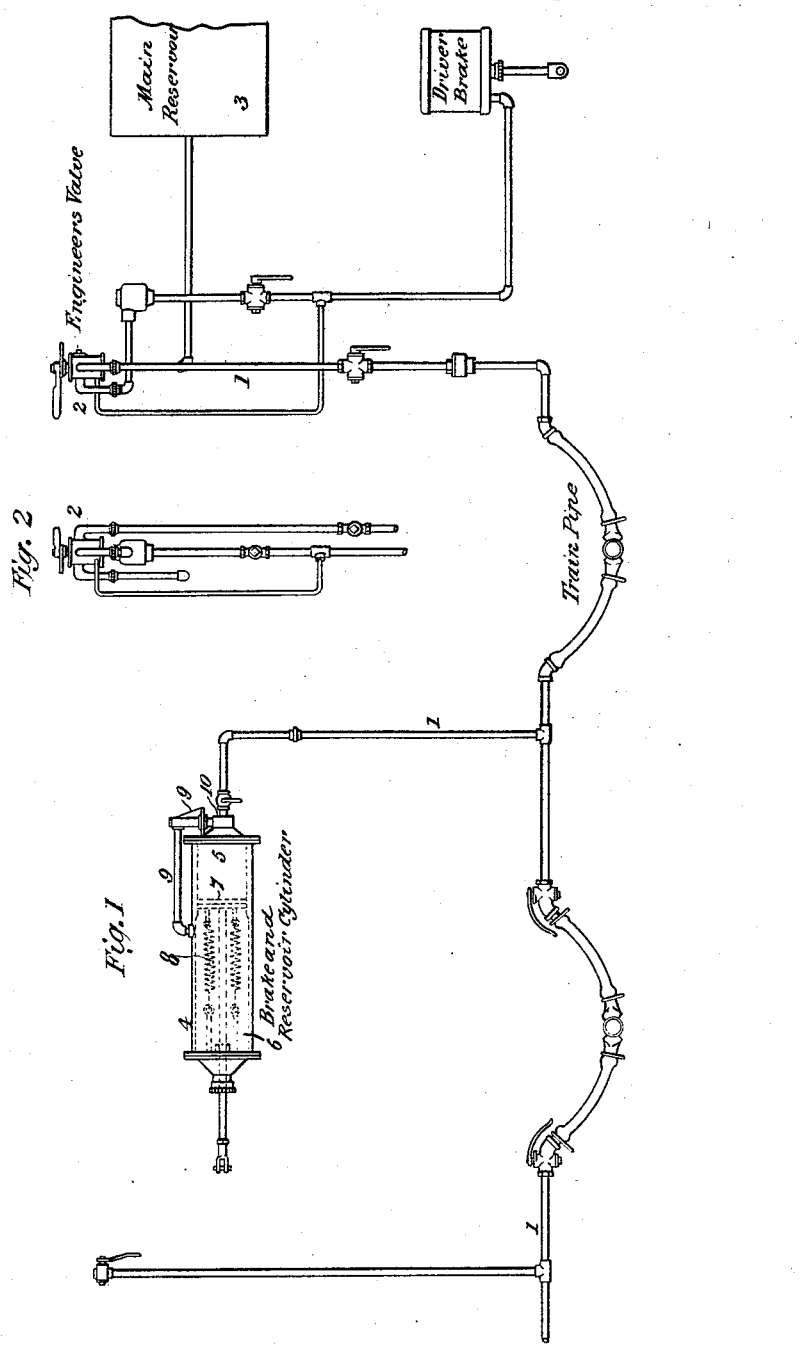
Witnesses:
Raphaël Netter
Robt. F. Gaylord
Inventor:
Edward G. Shortt,
by Duncan & Page
Attorneys

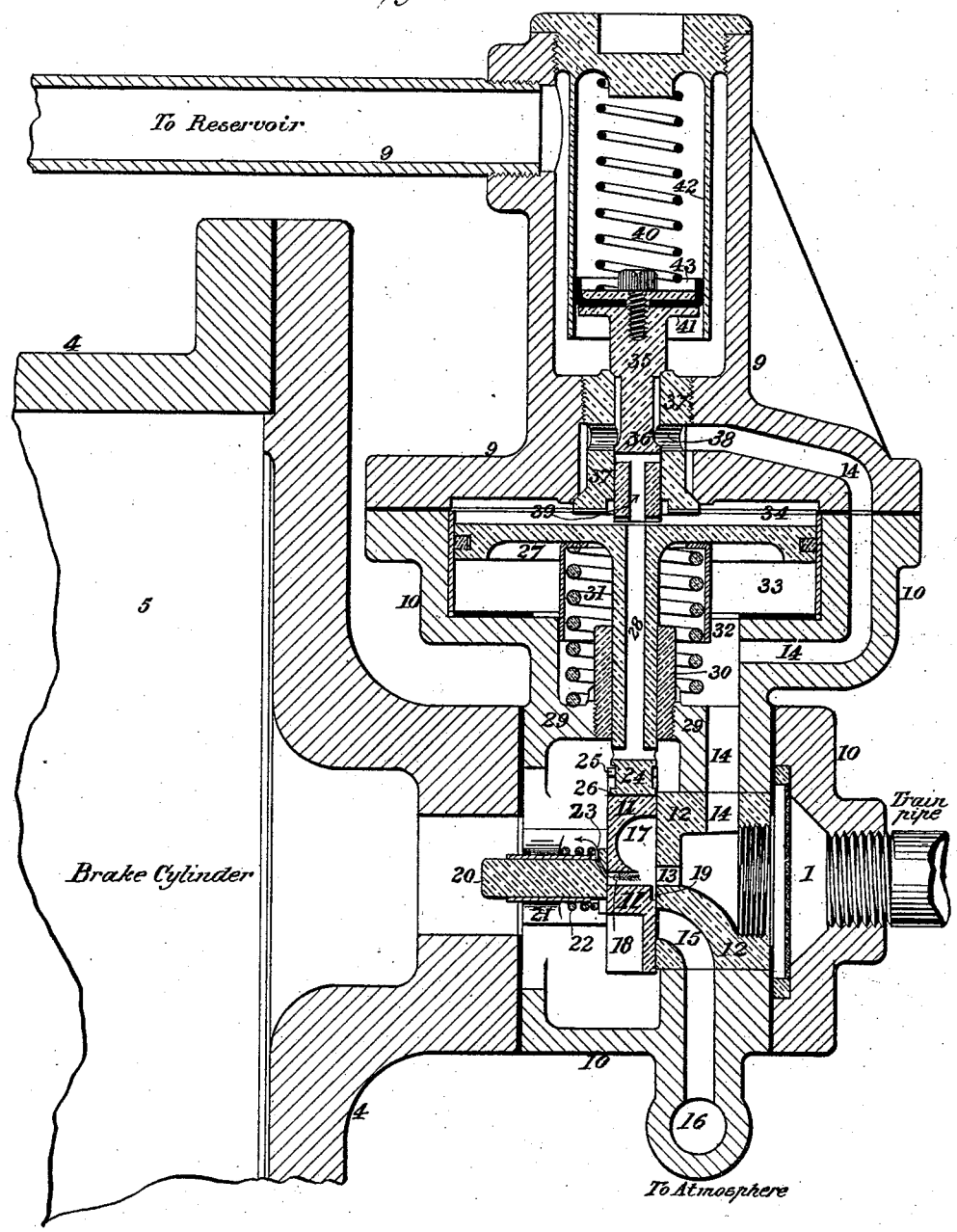

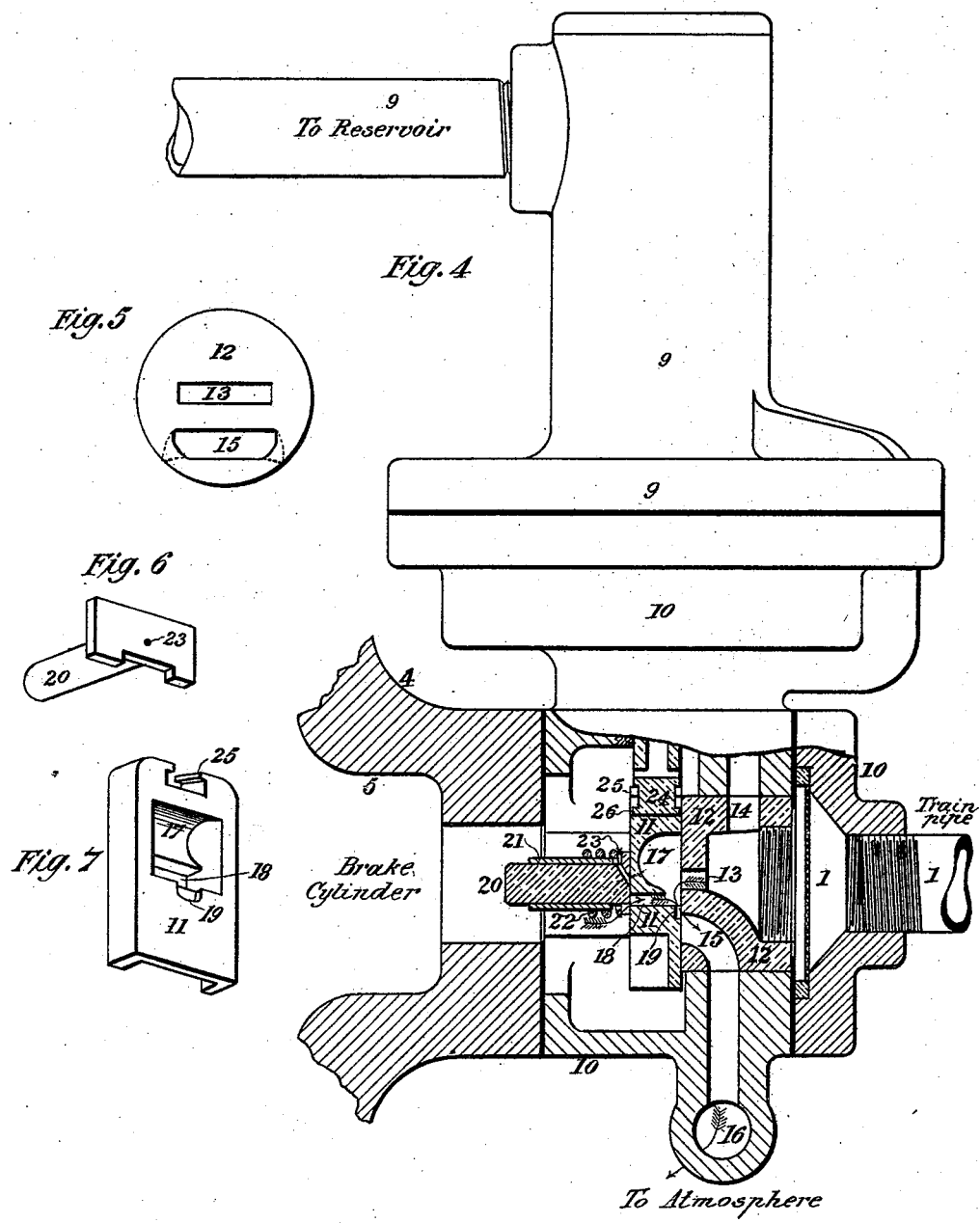

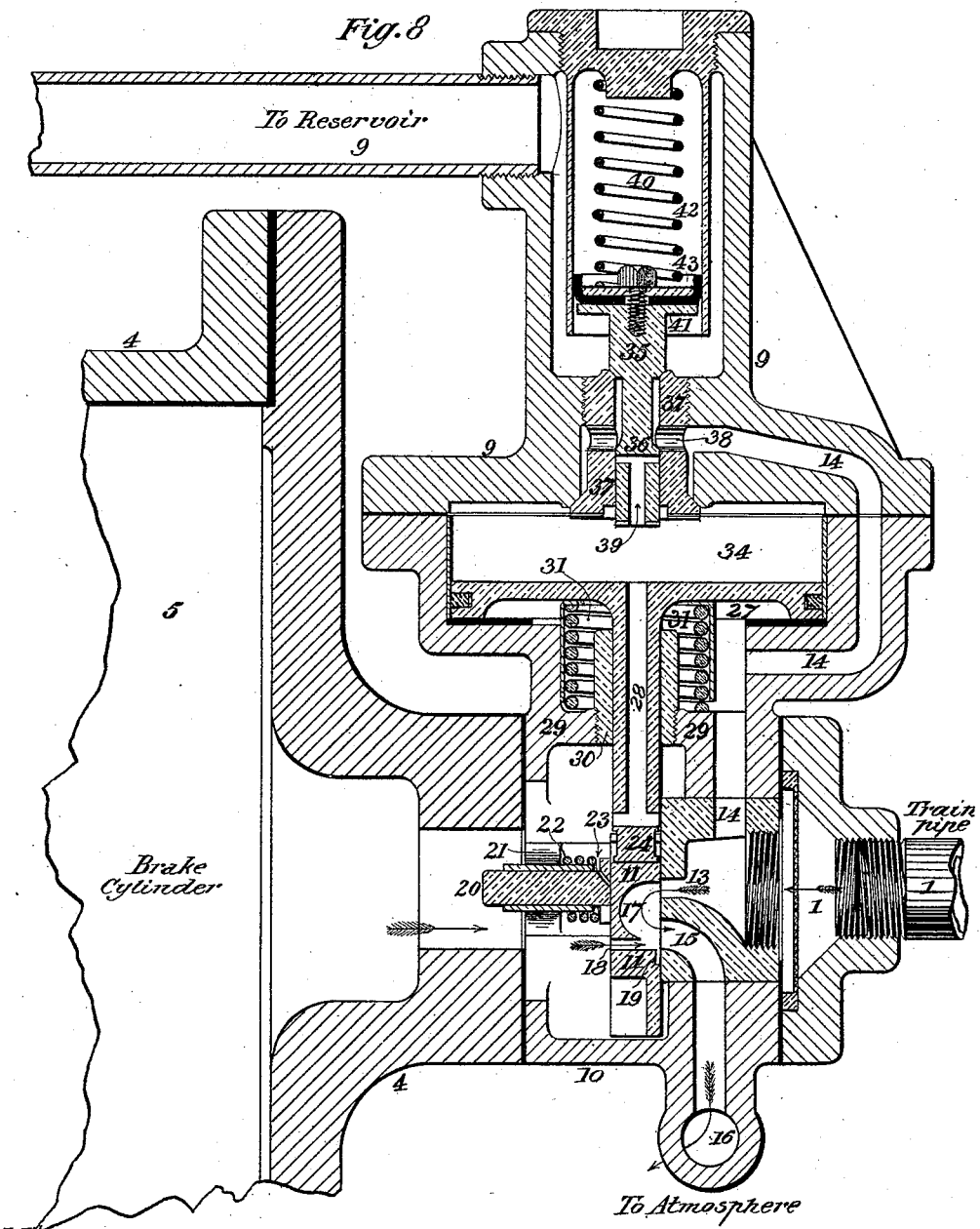

(No Model.) 7 Sheets—Sheet 5.
E. G. SHORTT.
AIR BRAKE VALVE MECHANISM.
No. 538,543. Patented Apr. 30, 1895.
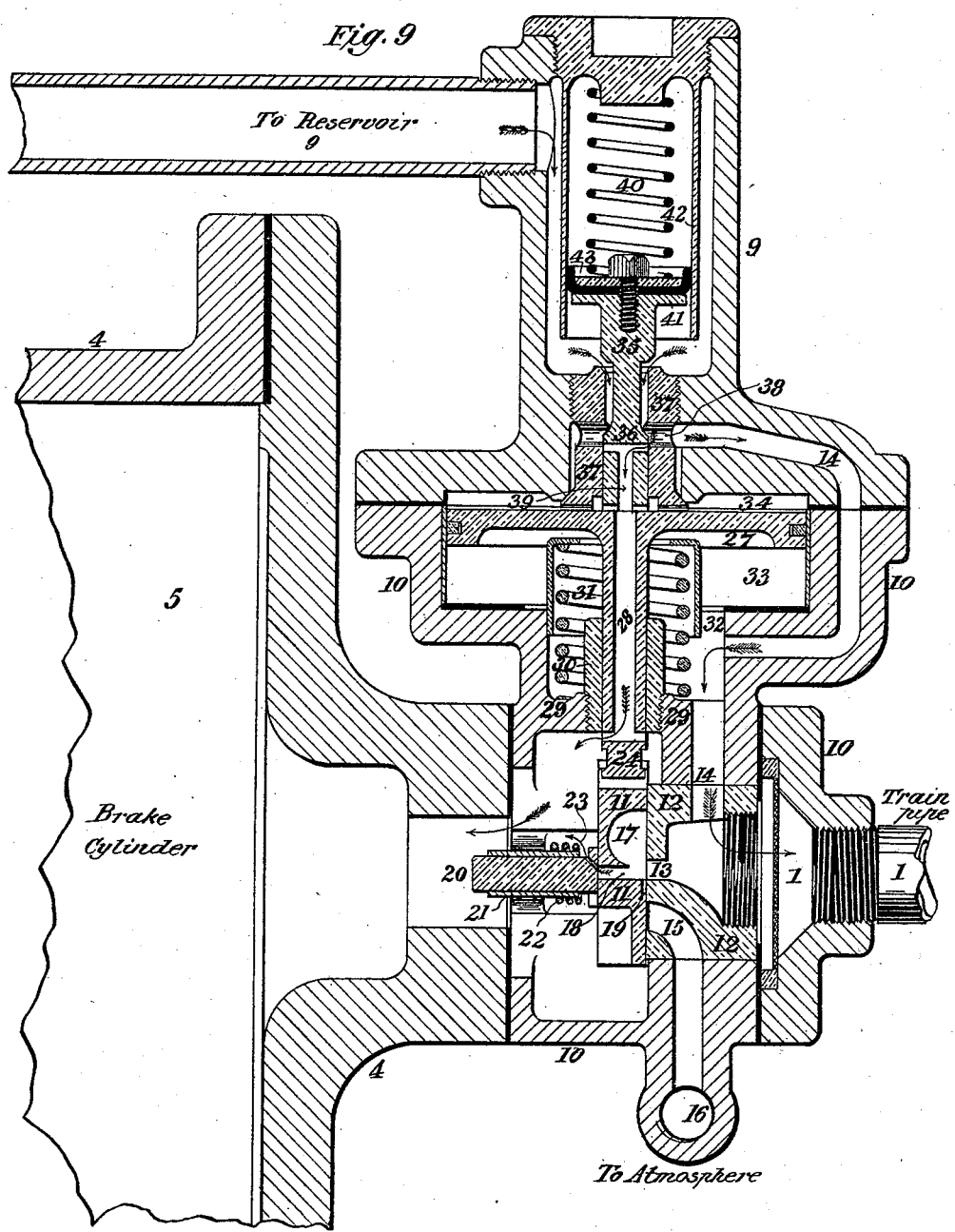

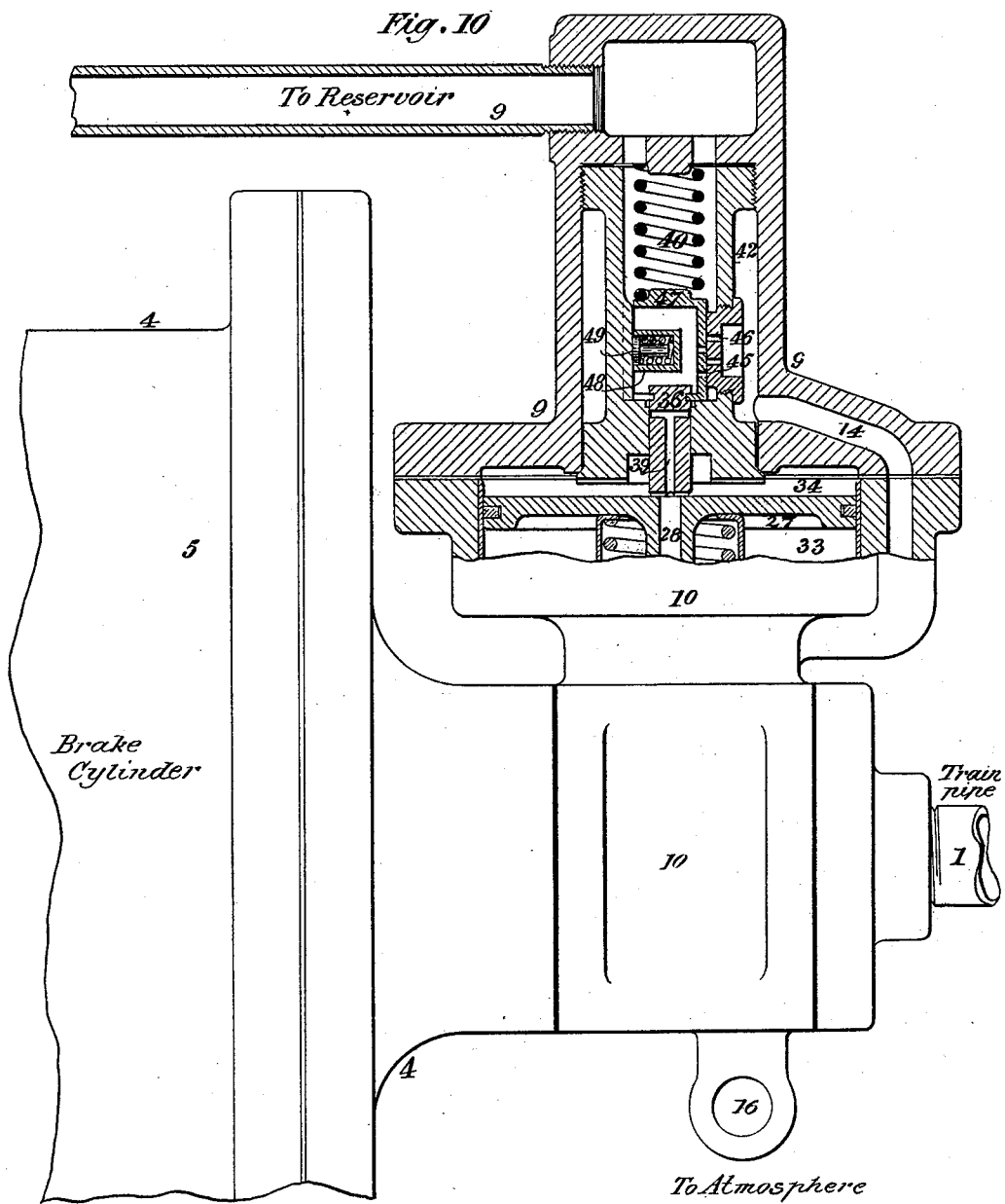

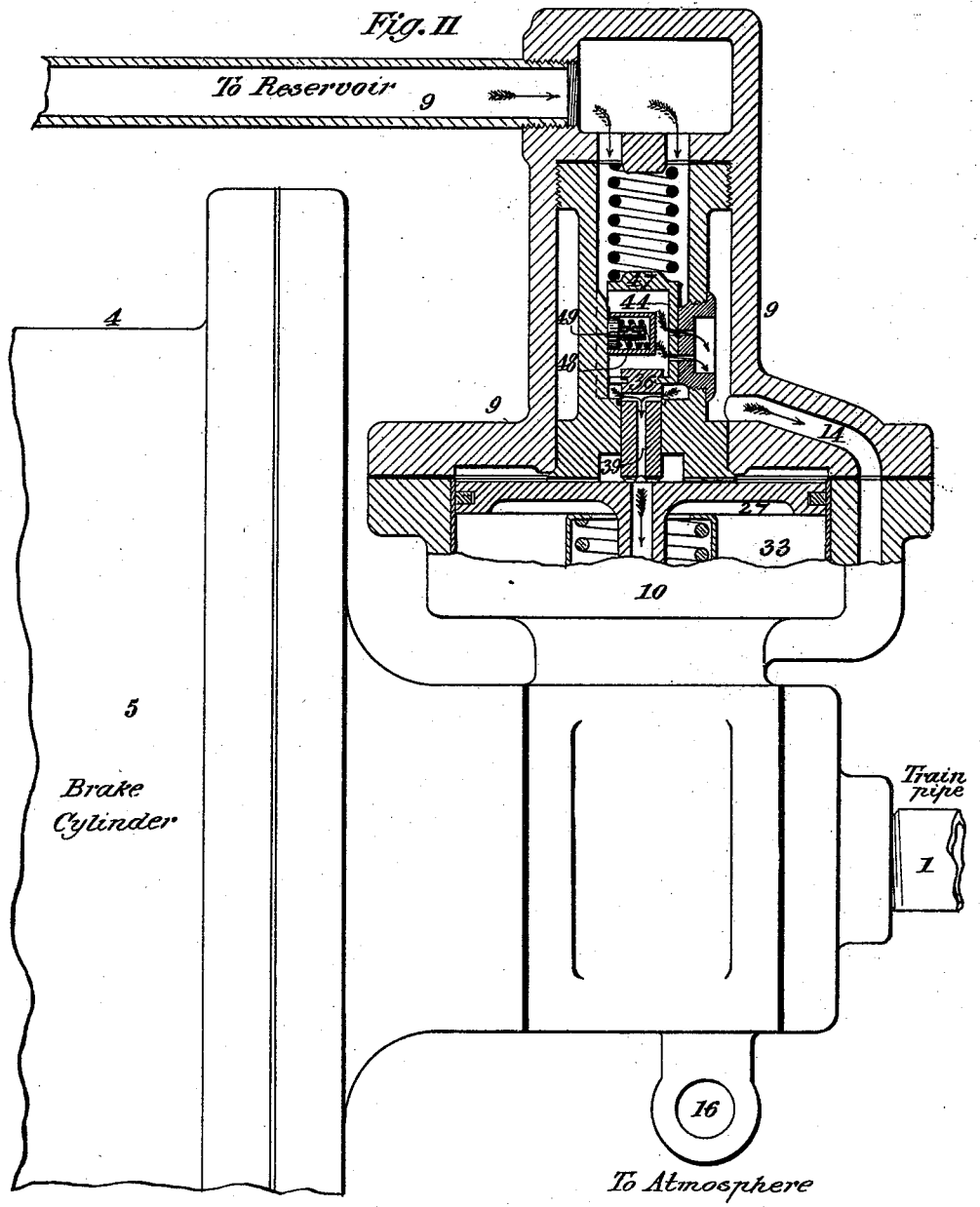

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

AIR-BRAKE VALVE MECHANISM.

SPECIFICATION forming part of Letters Patent No. 538,543, dated April 30, 1895.

Application filed June 17, 1893. Serial No. 478,014. (No model.)

*To all whom it may concern:*

Be it known that I, EDWARD G. SHORTT, a citizen of the United States, residing at Carthage, in the county of Jefferson and State of New York, have invented certain new and useful Improvements in Air-Brake Valve Mechanism, of which the following is a specification, reference being had to the drawings accompanying and forming a part of the same.

The present improvements relate generally to that kind of air-brake valve mechanism that is adapted to directly control and effect the operation of the piston of a brake cylinder, particularly of an equilibrio brake system.

The leading functions of this mechanism, are to control the operative or air pressure as between the train pipe, cylinder and reservoir; to open and close the train pipe and cylinder to local exhaust for the purposes of effecting a graduation or an emergency application of the brakes; and to produce a rapid train pipe exhaust, especially for an emergency application.

In the claims to follow the description of one form of my air-brake mechanism, I particularly indicate the elements, or combination of elements, that I regard as new and as of my invention.

In the drawings, Figure 1 represents an elevation detail view of an air-brake mechanism embodying my improvements, Fig. 2 being an elevation view, as seen from the left hand of Fig. 1, of the engineer's valve and connections. Fig. 3 is an enlarged view, in central vertical section, of the working end of the brake-cylinder and of the valve mechanism connecting the reservoir and the train-pipe to the same, the parts being shown in running position. Fig. 4 is a similar view in partial section only, the valve parts being in graduation position, Fig. 5 being a face view of the seat of the exhaust slide-valve, Fig. 6 being a perspective view of the feed-valve, and Fig. 7 a like view of the said exhaust slide-valve. Fig. 8 is a view like Fig. 2, except that the exhaust-valve is in emergency or full application position. Fig. 9 is a like view, except that the parts are in release or equalizing position. Fig. 10 shows, in similar manner, a modified form of the reservoir or storage valve in running position. Fig. 11 shows the same modification, the valve being in release or equalizing position.

Referring to Fig. 1, 1 represents the train pipe; 2, the engineer's valve; 3, the main reservoir; 4, a cylinder, of which 5 is the brake-cylinder or working end, and 6, the reservoir end; 7, the brake piston, which is to be considered as operatively connected to the brakes; 8, the springs that act to move the piston to release the brakes; 9, the pipe connection between the reservoir and train pipe, and 10 the casing of the exhaust valve parts.

11 represents the graduation and emergency valve, which is a plate-like slide valve, having vertical motion on the valve seat 12 arranged between the train pipe and the brake cylinder, said seat being provided with the train pipe port 13, with the train pipe passage 14, and with the exhaust port and passage 15 and 16 which leads to the atmosphere. This slide-valve is recessed by the curvilinear train-pipe exhaust passage 17 which in general form is semi-cylindrical (Figs. 4 and 7) and opens toward the valve seat. The vertical extent and the breadth of this passage is such, that upon proper movement of the valve (Fig. 8) the train-pipe port and exhaust port will be put to full open communication. This valve is also pierced by the charging and cylinder exhaust passage 18, of size somewhat smaller than the train-pipe port 13, and which serves in running position to put the brake cylinder space into communication with the train-pipe (Fig. 3) or with the exhaust passage 15 (Figs. 4 and 8) according to the position of the valve on its seat. In the inner face of the valve is also cut the shallow, narrow graduation passage 19, which opens into the passages 17 and 18, and is of a length less than the thickness of the seat part between the ports 13 and 15.

Just behind the slide valve and bearing against the same, is the feed valve 20, which slides in supports 21, and is held by spring 22 to contact with the slide valve, to close the charging passage 18 (Fig. 7) through the latter except for the small feed duct or passage 23 through the plug. Under suitable train-pipe pressure, as when releasing the brakes or recharging the cylinder, the feed valve is forced from the slide valve and the passage 18 is correspondingly opened. Under normal conditions of running, the feed duct serves to keep the cylinder charged, as against leakage or other loss of air pressure.

The slide valve is attached to the lower end of the piston rod 24, preferably by a loose lock connection 25 engaging a shoulder 26 on the piston rod, whereby the rod can have a slight motion relative to the valve. The piston rod 24 is attached to the piston or diaphragm 27, and is pierced by an open passage 28 which maintains open communication between the cylinder space and that above the piston. The piston moves practically air-tight in its chamber, and cuts off communication between the space below and the space above it. The casing walls 29, support the slide bearing and guide 30 of the piston-rod. 31 is a spring surrounding the guide 30 and acting to normally hold the piston in the running position. The train-pipe passage 14 communicates freely through opening 32 with the lower part 33 of the piston chamber. 34 represents the upper part or space of such chamber.

Just above the slide-valve piston is located the storage or reservoir valve 35, which controls the pipe or passage 9 to the reservoir and its communication with the train-pipe passage and chamber 34. The stem 36 of this valve passes loosely through the bore of the upper part of the valve seat bushing 37, and is of such size as to leave a space between it and the bushing below the valve face, which space communicates through side ports 38 with the train-pipe passage 14. Below these side ports the stem fills the bore of the bushing, and is perforated laterally and lengthwise by passage 39 which is closed at its upper end by the bushing walls when the valve 35 is seated, as shown in Fig. 3. The lower end of the valve stem projects into chamber 34 and in running position is in contact with the upper face of the slide-valve piston, this end being laterally grooved so that contact with such piston will not close the passage 39. This valve is held to its seat by the spring 40, which bears upon the valve-head 41 moving tightly in guide tube 42 by means of the cup-packing 43, which packing collapses to permit air to enter the tube, but by expansion against the tube prevents its escape therefrom. Thus, compressed air at reservoir pressure will be retained in the tube and will act to make the valve more positive as to its downward movements which otherwise (as when under spring pressure only) might be opened by the fluctuations of the slide-valve piston, as at the time of graduating.

Assuming that the parts are in running position, with the main reservoir, local reservoir, brake cylinder and train-pipe properly charged, the operation of this valve mechanism is as follows: Upon reducing the train-pipe pressure, say, about eight to ten pounds, the cylinder air above the slide-valve piston acts to push such piston down a distance represented by the variation of pressure between the top and bottom of this piston's chamber. This causes the slide-valve to move downwardly so as to bring its graduation passage slightly below the upper edge of the exhaust port and its charging, or the cylinder exhaust passage just below the lower edge of the feed valves, Fig. 4, and thereby the brake cylinder will be exhausted to produce a graduation application of the brakes. This downward movement of the slide-valve being against the tension of the spring under its operating piston, when equalization (the tension of the spring being considered) takes place between the cylinder side and the train pipe side of the slide valve piston, the said spring will be freed to lift the valve so as to close the exhaust port. A further or repeated reduction of train-pipe pressure can, if it be desirable, be then made and the brakes will be set yet harder; and these steps of graduation can be continued until the full application power of the brakes has been attained.

When it is desired to release the brakes, a proper increase of pressure in the train-pipe, as by connecting it with the main reservoir, will be first and most strongly felt under the piston of the slide-valve, whereupon such piston will be moved to the upper end of its chamber and against the reservoir-valve bushing. This returns the slide-valve to running position, and at the same time lifts the reservoir-valve, thus putting the reservoir into full communication with the train-pipe and effecting equalization of pressure between the train-pipe, brake cylinder and local reservoir and releasing the brakes. As equalization takes place, the reservoir-valve spring asserts itself to seat such valve, and the slide-valve piston is returned to normal or running position. During such action of releasing, the feed valve is pushed off the slide-valve and permits the free passage of air through the charging passage of the slide-valve.

When a full or emergency application is to be made, the train-pipe pressure will be lowered by a greater amount than in the case of a graduation application. This will cause the slide-valve piston to descend to its limit, with the piston resting on the lower face of its chamber (Fig. 8), thus putting the train-pipe and the cylinder into full communication with the exhaust port leading to the atmosphere, Fig. 8, and completely emptying both. In this connection, it is to be noted that the train-pipe is opened to the exhaust port by the passage independent of the passage opening the cylinder to such exhaust, the train-pipe and cylinder exhaust in practical effect being separated from each other, whereby it is particularly assured that the escaping cylinder air will not interfere with the desired reduction of the train-pipe pressure. To still further insure the train-pipe reductions, I make the exhaust port 15 as large, if not larger than the sum of the train-pipe port 13 and the cylinder exhaust passage 18; but more essentially, I make the train-pipe larger than the cylinder passage, and the air from the latter, having greater pressure and velocity, acts as an ejector or educting current to draw the train-pipe air through the former. This insures a rapid and full discharge of the train-pipe air, especially in cases where it may be desirable to use small ports and passages, and a corresponding increase in the speed of travel along the train pipe of the reduction air wave that acts to set in operation the various valves in the train-pipe line. This action is an important one, especially one of advantage on long trains; and I have demonstrated, in a brake system of maximum train length, that the difference in time between an emergency action effected by indiscriminately mingling the train-pipe and the cylinder exhaust jets and one effected by issuing them on the ejector principle, is marked and of great advantage to the latter procedure in the direction of securing a quicker application of the brakes. This action will increase the efficiency of other brake mechanism, as in case of a train including my apparatus and that of a different system. It is also to be noted that the valve piston when in normal or running position rests on the reservoir or storage valve as an abutment or stop and is supported hereby against movement under slight increase of the normal or running train-pipe pressure, such as an unusual increase in the feed flow.

I am aware that it is not new to exhaust the train-pipe or the brake-cylinders to the atmosphere locally. I exhaust these parts by one valve, and in such manner that the exhaust jet of one part is directed to assist or increase the speed of the exhaust of the other part.

In Figs. 10 and 11, I show a modified form of reservoir valve. Here the valve-head is in the form of a cylinder 44 (Fig. 11) having lateral openings 45 (Fig. 10) designed to register with openings 46 in the tube 42 when the valve 36 fixed to the valve-head or cylinder is lifted by the slide-valve piston. This cylinder is open on one side and up to its upper end 47, which opening, when the parts are in the running position of Fig. 10, is closed by the walls of the tube 42. Thus, the pressure of spring 40, as well as the reservoir pressure, is upon this cylindrical head to hold it properly to place, closing communication from the reservoir to the train-pipe. This cylinder carries, in a casing 48 secured thereto, the spring-pressed piston 49, which bears against the tube and insures that the valve side of the cylinder containing the openings 45 shall bear upon the tube to hold the openings 45 and 46 properly closed. The form of this reservoir or storage valve is not essential so long as its function is subserved, which is to hold the reservoir passage closed against any but a high train-pipe or recharging pressure.

After an application, of either service or emergency character, or at any time when the parts are in normal or running position, the local reservoirs may be recharged by a train pipe pressure in excess of the then reservoir pressure and sufficient to lift the reservoir or storage valve between the reservoir and the train pipe. In fact, at once after release, or simultaneously with the releasing action, recharging of the auxiliary reservoir may be effected, depending upon the release pressure and the then pressure of the auxiliary reservoir.

What is claimed as new is—

1. In combination in an equilibrio air-brake mechanism and with the brake cylinder and train pipe thereof, a valve controlling an exhaust passage from the train pipe and also controlling an exhaust passage from the cylinder and operable by a variation of train pipe pressure to open said passages.

2. In combination in an equilibrio air-brake mechanism and with the brake cylinder and train pipe thereof, a valve controlling an exhaust passage from the train pipe and an exhaust passage from the cylinder, and a valve operating piston actuated by variations of train pipe pressure for operating said valve.

3. In combination in an equilibrio air-brake mechanism and with the train pipe and cylinder thereof, a valve controlling an exhaust passage from the train pipe and an exhaust passage from the brake cylinder, a piston for operating said valve and normally having train pipe air on one side thereof and cylinder air on the other side thereof, whereby upon train pipe reduction of pressure the valve will be operated to conjointly exhaust the train pipe and the brake cylinder.

4. In combination with an air-brake cylinder and train pipe, a slide valve controlling an exhaust port from the train pipe and one from the cylinder and operable by variation between the train pipe and cylinder pressures to open said passages, and a spring acting to close the same when a certain cylinder reduction has been attained, whereby to effect a graduation application of the brakes.

5. In combination with an air-brake cylinder and train pipe, an exhaust passage from the train pipe and one from the cylinder, a slide valve controlling said exhaust passages a valve-operating piston having train pipe pressure upon one of its faces and acting upon a reduction of train pipe pressure to open said exhaust passages to produce a graduation exhaust from the train pipe and from the cylinder, and a spring operating upon a certain cylinder reduction to close said valve and stop the graduation exhaust.

6. In combination in an equilibrio air-brake mechanism and with the train pipe and cylinder thereof, an exhaust passage from the train pipe, an exhaust passage from the cylinder of smaller size than that from the train pipe, and a valve mechanism controlling said passages and operable by reduction of train pipe pressure to open the same to exhaust.

7. In combination with an air-brake cylinder and train pipe, a valve controlling an exhaust passage from the cylinder and one from the train pipe, a valve operating piston arranged between the train pipe and cylinder spaces, and a passage from the train pipe to one side of said piston, and a passage from the cylinder to the other side of said piston of smaller conducting size.

8. In combination in an equillbrio air-brake mechanism and with the brake cylinder and train pipe thereof, an exhaust passage from the train pipe, an exhaust passage from the cylinder, a charging passage from the train pipe to the cylinder, and a valve controlling said passages and operable under reduction of train pipe pressure to close the feed passage and to open the train pipe and cylinder exhaust passages.

9. In combination with an air-brake cylinder and train pipe, a valve controlling an exhaust passage from the cylinder and one from the train pipe, and a feed passage from the train pipe to the cylinder normally held open by said valve when the same is in running position but which is closed by said valve when the same is moved to exhaust the cylinder and train pipe.

10. In combination in an equilibrio air-brake mechanism and with the brake cylinder and train pipe thereof, an exhaust passage from the train pipe and a separate exhaust passage from the cylinder, and a valve controlling said passages and acting to direct the train pipe and the cylinder exhaust jets separately to the atmosphere.

11. In combination with a brake cylinder and train pipe, an exhaust passage from the train pipe and one from the cylinder, a valve controlling said passages and containing a train pipe exhaust passage and a cylinder exhaust passage of smaller size than the train pipe passage and operable by variation of train pipe pressure to exhaust the train pipe and the cylinder.

12. In combination with an air-brake cylinder and train pipe, an exhaust passage from the train pipe and an exhaust passage from the cylinder, a slide valve controlling said exhaust passages, a piston for actuating said valve and operable under variations of train pipe pressure, and a spring supported abutment for holding said piston in running position, and against movement by increase of feed flow.

13. In combination in an equilibrio air brake mechanism and with the train pipe auxiliary reservoir and cylinder thereof, a valve controlling an exhaust port from the cylinder, a separate reservoir valve controlling a passage from the reservoir to the cylinder, and valve operating mechanism normally held in running position by said reservoir valve and actuated by reduced train pipe pressure to open said exhaust valve and by increased train pipe pressure to open said reservoir valve.

14. In combination in an equilibrio air-brake mechanism and with the train pipe auxiliary reservoir and brake cylinder thereof, a valve controlling an exhaust port from the cylinder, a valve controlling a passage from the reservoir to the train pipe and to the cylinder, and valve operating mechanism actuated by a reduction of train pipe pressure to open said exhaust valve, and operated by an increase of train pipe pressure to open said reservoir valve, to effect equalization of reservoir pressure with train pipe and cylinder pressures.

15. In combination in an equilibrio air-brake mechanism, and with the train pipe auxiliary reservoir and brake cylinder thereof, a valve controlling an exhaust port from the cylinder, a valve controlling a passage from the reservoir to the train pipe, and a valve operating mechanism actuated by a lowering of train pipe pressure to open said exhaust valve and by an increase of train pressure to open said reservoir valve, to effect equalization of reservoir pressure with train pipe pressure.

EDWARD G. SHORTT.

Witnesses:
DAVID B. GERNER,
H. B. EDMONDS.